(12) United States Patent
Kimball et al.

(10) Patent No.: US 9,305,017 B2
(45) Date of Patent: *Apr. 5, 2016

(54) DATABASE VIRTUALIZATION

(71) Applicant: Microsoft Corporation, Redmond, WA (US)

(72) Inventors: Andrew E. Kimball, Sammamish, WA (US); Jeffrey R. Currier, Issaquah, WA (US); Xiaoyu Wu, Sammamish, WA (US); Zhongwei Wu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,117

(22) Filed: Dec. 12, 2014

(65) Prior Publication Data

US 2015/0095377 A1 Apr. 2, 2015

Related U.S. Application Data

(60) Continuation of application No. 14/170,655, filed on Feb. 3, 2014, now Pat. No. 8,924,575, which is a division of application No. 12/707,675, filed on Feb. 18, 2010, now Pat. No. 8,645,550.

(51) Int. Cl.
*G06F 15/16* (2006.01)
*G06F 17/30* (2006.01)
(Continued)

(52) U.S. Cl.
CPC ...... *G06F 17/30227* (2013.01); *G06F 17/3056* (2013.01); *G06F 17/30368* (2013.01);
(Continued)

(58) Field of Classification Search
CPC ............ G06F 17/3056; H04L 63/0281; H04L 67/2814; H04L 67/1021
USPC .................... 709/200–203, 217–227; 707/784
See application file for complete search history.

(56) References Cited

U.S. PATENT DOCUMENTS 7,650,338 B2 1/2010 Grossfeld et al.
7,941,469 B2 5/2011 Grossfeld et al.
(Continued)

FOREIGN PATENT DOCUMENTS

EP        1329812 A3    7/2003

OTHER PUBLICATIONS

Tannenbaum, Adrienne, "Metadata Solutions: Metamodels as a Piece of the Pie", Retrieved at <<http://www.informit.com/articles/article.aspx?p=25320&seqNum=4>>, Feb. 15, 2002, pp. 5.
(Continued)

*Primary Examiner* — Moustafa M Meky
(74) *Attorney, Agent, or Firm* — Nicholas Chen; Kate Drakos; Micky Minhas

(57) ABSTRACT

Aspects of the subject matter described herein relate database virtualization. In aspects, clusters of database servers may be located at various locations of the Internet. When a client seeks to access a logical database, the client may send a logical server and logical database name in a data structure. These names may be used to find a physical server(s) and database(s) that correspond to the logical database. Once the location is determined, a proxy component is used to intercept and/or forward communications between the client and the physical server(s) and database(s) corresponding to the logical database. Using this system, a client may access data from a logical database without knowing the physical address of the logical user database.

20 Claims, 6 Drawing Sheets

(51) Int. Cl.
  *H04L 29/08* (2006.01)
  *H04L 29/06* (2006.01)
  *G06F 21/33* (2013.01)
  *G06F 21/62* (2013.01)

(52) U.S. Cl.
  CPC ............ *G06F21/33* (2013.01); *G06F 21/6227* (2013.01); *H04L 63/0281* (2013.01); *H04L 67/1021* (2013.01); *H04L 67/2814* (2013.01); *H04L 67/1014* (2013.01)

(56) References Cited

U.S. PATENT DOCUMENTS

| | | | |
|---|---|---|---|
| 8,291,000 | B2 | 10/2012 | Grossfeld et al. |
| 8,327,421 | B2 | 12/2012 | Ting |
| 8,489,742 | B2 | 7/2013 | Clubb et al. |
| 8,924,575 | B2 * | 12/2014 | Kimball et al. ............... 709/228 |
| 2003/0051021 | A1 | 3/2003 | Hirschfeld et al. |
| 2006/0294038 | A1 | 12/2006 | Grossfeld et al. |
| 2007/0094375 | A1 | 4/2007 | Snyder et al. |
| 2007/0186106 | A1 | 8/2007 | Ting et al. |
| 2008/0256607 | A1 | 10/2008 | Janedittakarn et al. |
| 2009/0327211 | A1 | 12/2009 | McCune et al. |

OTHER PUBLICATIONS

Park, Jinsoo, "Schema Integration Methodology and Toolkit for Heterogeneous and Distributed Geographic Database", Retrieved at <<http://misrc.umn.edu/workingpapers/fullPapers/2001/0131_080101.pdf>>, Aug. 2001, pp. 23.

Biggar, et al., "The Benefits of Virtualizing Microsoft SQL Server in Hitachi Storage Environments", Retrieved at <<http://www.hds.com/assets/pdf/the-benefits-of-virtualizing-microsoft-sql-server-wp.pdf>>, Jul. 2009, pp. 15.

"Logical Server Management", Retrieved at <<http://www.docs.hp.com/en/T8671-90064/ch04s03.html>>, Jan. 18, 2010, pp. 7.

"Cloud Computing and Virtualization", Retrieved at <<http://www.shopfujitsu.com/www/content/products/solutions/large_enterprise/large_enterprise_virtualization.php>>, Jan. 18, 2010, pp. 3.

"Ex Parte Quayle Action", U.S. Appl. No. 12/707,675, mailing date Jul. 24, 2013, pp. 4.

"Notice of Allowance", U.S. Appl. No. 14/170,655, mailing date Aug. 27, 2014, pp. 7.

* cited by examiner

DATABASE VIRTUALIZATION

CROSS REFERENCE TO RELATED APPLICATIONS

This application is a continuation of and claims the benefit of and priority to U.S. patent application Ser. No. 14/170,655, entitled "Database Virtualization", filed Feb. 3, 2014 by Andrew E. Kimball et al., the entire contents of which are expressly incorporated by reference. That application is a divisional of and claims the benefit of and priority to U.S. patent application Ser. No. 12/707,675, now U.S. Pat. No. 8,645,550, entitled "Database Virtualization", filed Feb. 18, 2010 by Andrew E. Kimball et al., the entire contents of which are expressly incorporated by reference.

BACKGROUND

When a client connects to a database, the client may provide a connection string. The connection string may be used to negotiate and establish a connection with a database server. The connection string may tightly couple the client to a particular physical database server. That is, the connection string may identify a particular physical database server on which the client seeks to access data. This tight coupling may be undesirable in many scenarios.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate database virtualization. In aspects, clusters of database servers may be located at various locations of the Internet. When a client seeks to access a logical database, the client may send a logical server and logical database name in a data structure. These names may be used to find a physical server(s) and database(s) that correspond to the logical database. A proxy component is used to intercept and/or forward communications between the client and the physical server(s) and database(s) corresponding to the logical database. Using this system, a client may access data from a logical database without knowing the physical address of the logical database.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
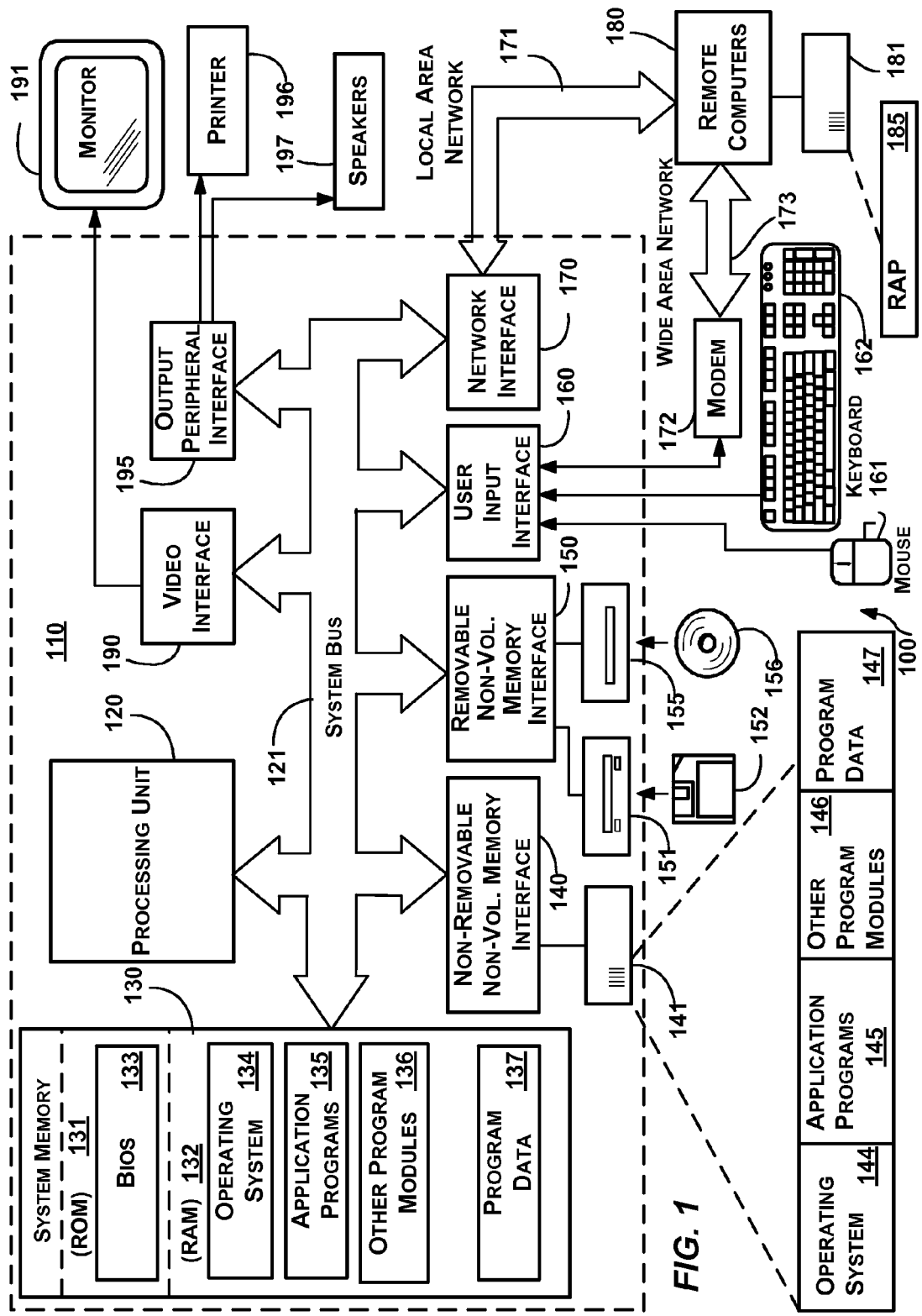
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Database Virtualization

Figure 2:
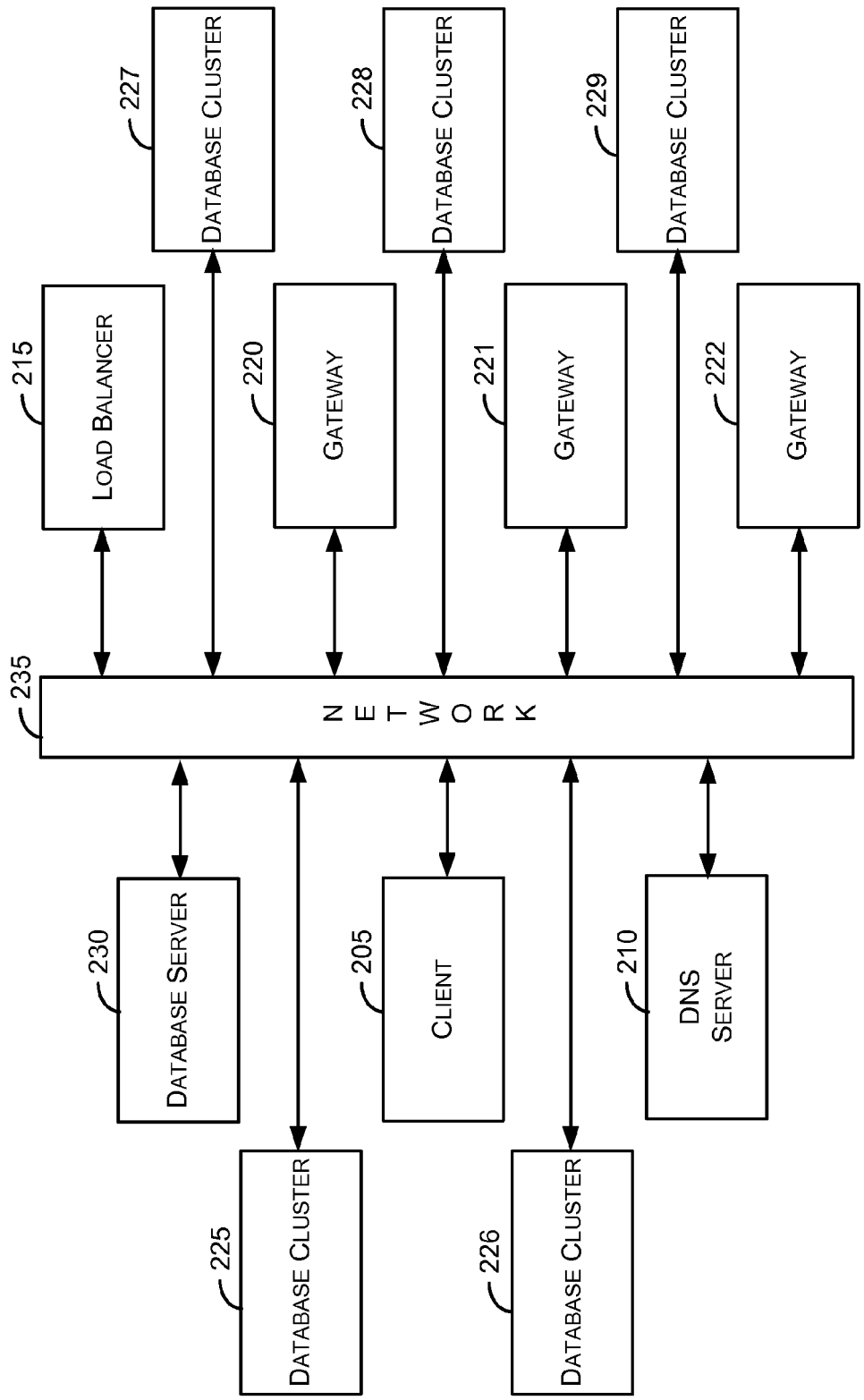
FIG. 2 is a block diagram that generally represents an exemplary environment in which aspects of the subject matter described herein may be implemented.

As mentioned previously, tightly coupling a client to a particular physical database server may be undesirable in some scenarios. FIG. 2 is a block diagram that generally represents an exemplary environment in which aspects of the subject matter described herein may be implemented. The environment may include a client 205, a domain name system (DNS) server 210, a load balancer 215, gateways 220-222, database clusters 225-229, a database server 230, a network 235, and may include other entities (not shown).

In an embodiment, the network 235 may comprise the Internet. In an embodiment, the network 235 may comprise one or more local area networks, one or more telephone networks, one or more wide area networks, direct connections, virtual connections, private networks, virtual private networks, some combination of the above, and the like.

The client 205 may include any process that seeks to access a database. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Access as used herein may include reading data, writing data, deleting data, updating data, a combination including two or more of the above, and the like.

A database may comprise a relational database, object-oriented database, hierarchical database, network database, other type of database, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like.

Data in a database may be accessed via a database management system (DBMS). A DBMS may comprise one or more programs that control organization, storage, management, and retrieval of data of a database. A DBMS may receive requests to access data in a database and may perform the operations needed to provide this access. Access as used herein may include reading data, writing data, deleting data, updating data, a combination including two or more of the above, and the like.

Herein unless the context dictates otherwise whenever language indicates that a request is sent to a database or a response is returned from a database, this language is to be understood as the request being sent to a DBMS associated with the database and the response being returned via the DBMS.

In describing aspects of the subject matter described herein, for simplicity, terminology associated with relational databases is sometimes used herein. Although relational database terminology is sometimes used herein, the teachings herein may also be applied to other types of databases including those that have been mentioned previously.

The client 205 may comprise or reside on one or more general or special purpose computing devices. Such devices may include, for example, personal computers, server computers, hand-held or laptop devices, multiprocessor systems, microcontroller-based systems, set top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the client 205 indicated in FIG. 2 comprises the computer 110 of FIG. 1.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. In an embodiment, a client and a server may both be peers, servers, or clients. In one embodiment, a client and a server may be implemented on the same physical machine.

As used herein, each of the terms "server" and "client" may refer to one or more physical entities, one or more processes executing on one or more physical entities, and the like. Thus, a server may include an actual physical node upon which one or more processes execute, a service executing on one or more physical nodes, or a group of nodes that together provide a service. A service may include one or more processes executing on one or more physical entities. Furthermore, a single process may implement one or more servers.

The DNS server 210, load balancer 215, gateways 220-222, servers of the database clusters 225-229, and database server 230 may also reside on one or more general or special purpose computing devices (such as the devices mentioned in conjunction with the client 205). An exemplary device that may be configured to act as an entity mentioned above comprises the computer 110 of FIG. 1.

The DNS server 210 resolves network names (e.g., www.example.com) to IP addresses. When the DNS server 210 receives a request to resolve a network name, the DNS server 210 may look up an IP address associated with the network name using one or more data structures. The DNS server 210 may resolve a network name into an address of a database server such as the database server 230, a gateway such as the gateway 220, a load balancer such as the load balancer 215, or some other network entity.

For example, a DNS server administrator may associate a network name with an address of a database server (e.g., database server 230) when a single database server is associated with a client. As another example, a DNS server administrator may associate a network name with an address of a gateway (e.g., gateway 220) of a cluster when the cluster does not have multiple gateways. As another example, a DNS server administrator may associate a network name with an address of a load balancer (e.g., load balancer 215) when a cluster has multiple gateways that are load balanced through the load balancer.

In one embodiment, each gateway may act as a proxy for databases in an assigned database cluster. For example, the gateway 220 may act as a proxy for databases in the database cluster 227, the gateway 221 may act as a proxy for databases in the database cluster 228, and the gateway 222 may act as a proxy for databases in the database cluster 229, while the database clusters 225 and 226 may have other gateways (not shown) that act as proxies for databases therein.

In another embodiment, a gateway may act as a proxy for databases in more than one database cluster. For example, when database clusters are in close proximity, a pool of gateways may act as proxies for databases in the database clusters. As another example, when migrating data from one database cluster to another database cluster, a gateway may act as a proxy for databases included on both clusters for a period of time.

The DNS server 210 may determine an entity to resolve a network name into based on geographical, network topology, client address, or other information about the client.

The load balancer 215 may determine a gateway to assist the client 205 in accessing data from a database using any suitable load balancing algorithm. In one embodiment, there may be at least one load balancer for each of the database clusters 225-229. A gateway (e.g., one of the gateways 220-222) selected by the load balancer 215 may receive requests from clients regarding data in the logical databases, negotiate connection parameters with the client 205, authenticate the client 205 or an entity associated therewith, determine whether the client is authorized to access indicated data of a database, and act as a proxy to retrieve data from and send data to the database. A gateway may act as a proxy to data of a database by connecting to the database and retrieving or updating data as requested by the client 205. A gateway may forward data retrieved from the database to the client 205 as well as result codes, if any, generated by the database in response to updating data. Updating data may include adding data, modifying data, or deleting data.

A database cluster (e.g., each of the database clusters 225-229) may include one or more physical servers. One or more physical servers may host (e.g., act as) one or more logical servers. A logical server corresponds to a collection of one or more logical databases. Each logical server may include one or more logical database. In one embodiment, one or more of the logical databases may be logical master databases while the rest of the logical databases may comprise logical user databases.

The term "logical server" is used to represent a concept that a server may be hosted on one or more physical or virtual machines. For example, a physical machine may host one or more logical servers or portions thereof. As another example, two or more physical machines may host one or more logical servers.

Likewise, the term "logical database" is used to represent a concept that a database may be implemented by one or more physical databases. For example, a single physical database may store and provide access to the data for multiple logical databases. As another example, a two or more physical databases may store and provide access to the data for one or more logical databases. As yet another example, one or more physical databases may store and provide access to portions of the data for one or more logical databases.

In one implementation, a logical database may correspond to a partition of a physical database. For example, a physical database may store the data of several logical databases. In another implementation, a logical database may correspond to an actual physical database.

Figure 3:
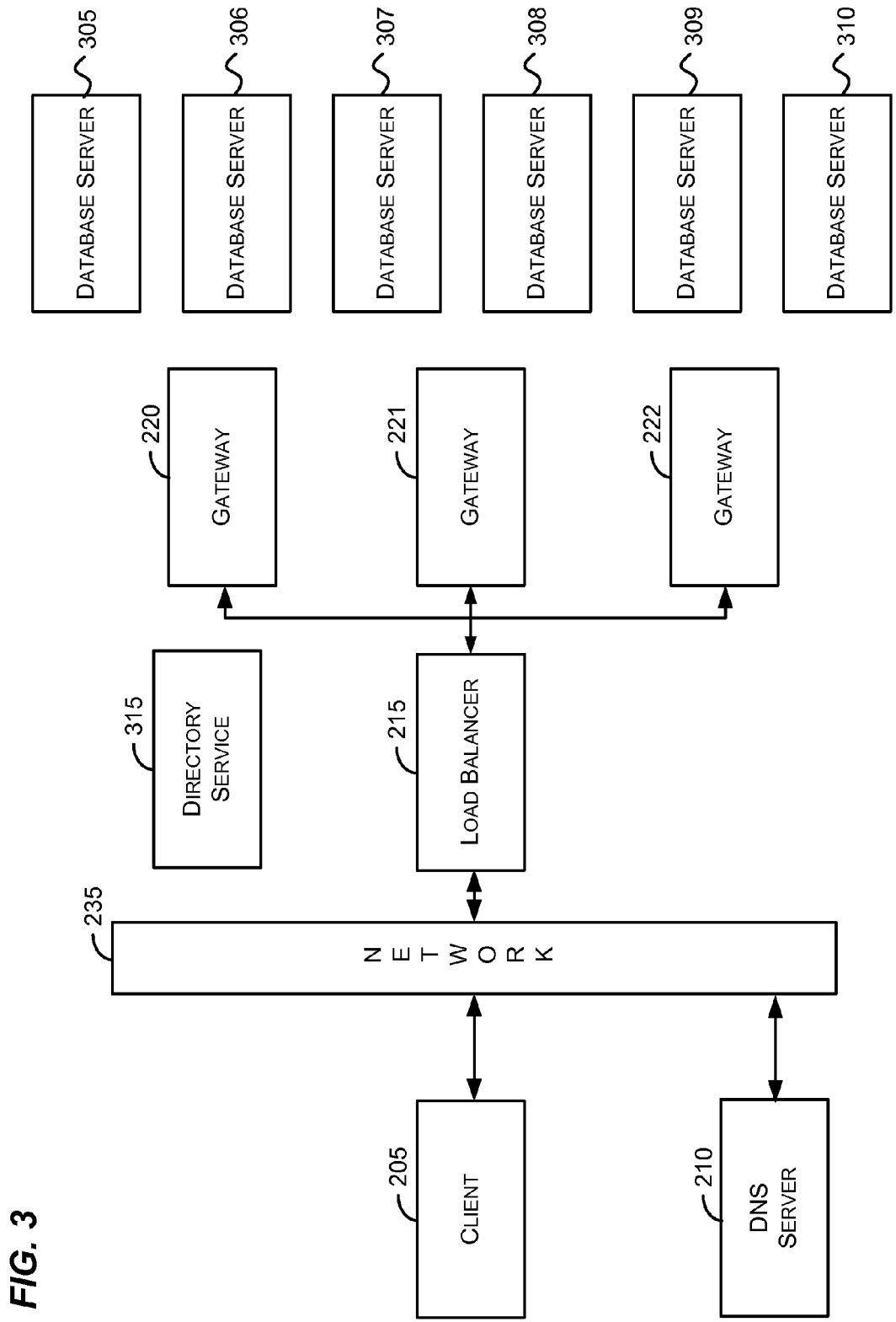
FIG. 3 is a block diagram that generally represents an environment in which a client is referred to a particular database cluster in accordance with aspects of the subject matter described herein.

FIG. 3 is a block diagram that generally represents an environment in which a client is referred to a particular database cluster in accordance with aspects of the subject matter described herein. As illustrated, the client 205 has been referred to the load balancer 215 via the DNS server 210. The database servers 305-310 are servers that host logical databases. A gateway may be assigned to one or more database servers and assignments to database servers may overlap. One or more of the database servers 305-310 may host logical master databases and/or logical user databases. As described in more detail below, a logical master database may include information usable to authenticate a user and enforce access authorization. Logical user databases are databases in which data of clients may be stored.

Below are exemplary actions that may occur when the client seeks to access data on a database.

1. The client 205 may attempt to resolve a server name into an IP address. To do this the client 205 may send the server name to the DNS server 210. In response, the DNS server 210 may resolve the server name into an IP address. The DNS server 210 may use geography or other information (as mentioned previously) to determine an appropriate IP address to return to the client 205. For example, if the DNS server 210 determines that the client 205's logical database resides in eastern Canada, the DNS server 210 may determine an address of a server that resides in eastern Canada and return an IP address of the server to the client 205. Where the IP address corresponds to a database cluster, the IP address returned by the DNS server 210 may correspond to a load balancer associated with the database cluster. In this case, the IP address returned by the DNS server 210 may correspond to a public IP address of the load balancer 215.

2. After the client 205 has received the IP address, the client may attempt to establish a connection with a server (e.g., the load balancer 215) of the IP address. The client 205 may use the Tabular Data Stream (TDS) protocol, an XML based protocol (such as SOAP), supported, for example, via an Object Linking and Embedding, Database (OLEDB) client API, or some other protocol and client API to attempt to establish the connection.

3. The load balancer 215 may use a load balancing algorithm to determine a gateway to provide access to the logical database. The load balancer 215 may then send the client's request to the selected gateway. When subsequent communications of the same connection come to the load balancer 215, the load balancer 215 may also forward these requests to the same gateway.

4. After a gateway (e.g., one of the gateways 220-222) has received the request, the gateway may negotiate the parameters of a connection with the client. For example, the client and gateway may determine what type of encryption protocol is to be used before authenticating the client.

5. After the connection parameters have been negotiated, the client may send a login request. The login request may include or be conveyed with a logical server name as well as a logical database name.

6. Using this information, the gateway may locate a logical master database associated with the client by providing the information to a directory service 315. The gateway may pass a logical database name provided by the client to the directory service 315 to obtain the logical master database associated with the client. In one embodiment, the gateway may maintain directory information locally and the directory service 315 may be included on the gateway or omitted. The directory service 315 may comprise a process as that term has been defined herein.

If the client 205 is utilizing the TDS protocol, the client 205 may pass a logical server name in a server name field of the TDS protocol. The client 205 may also pass the logical server name by embedding the logical server name in another field such as the user name of the connection string. For example, the client 205 may pass the logical server name by appending an "@" character together with the logical server name to the user name by passing "username@LogicalServerName" in a connection string sent to the server.

7. The gateway may then access the master database to obtain authentication and authorization information regarding the client.

8. With this information the gateway may authenticate the client. If the client does not pass authentication, the connection to the client may be terminated.

9. If the client passes authentication, the gateway may then determine a physical server and database for the client. The gateway may do this by providing the logical server name and database name to the directory service 315. In response, the directory service 315 may return a physical server and database (or partition) to the gateway.

To associate logical servers and databases to physical servers, the directory service 315 may include a table or other data structure that maps from logical server and database names to physical servers and database names. Such a table may, for example, include fields such as:

```
[logical_server_name]    NVARCHAR(128)    NOT NULL,
[logical_database_name]  NVARCHAR(128)    NOT NULL,
[physical_server_name]   NVARCHAR(64),
[physical_database_name] NVARCHAR(128),
[low]                    VARBINARY(256),
[high]                   VARBINARY(256)
```

Given a logical server name and a logical database name, the directory service 315 may use the table to find an associated physical server and physical database. Where the physical database is partitioned, the low and high values may be used to find a database partition that includes the user's logical database.

10. After receiving information that identifies the physical server and database names, the gateway may establish a connection with the physical server and login to the specified physical database. In response, the database may send a login response.

11. The gateway may then send this login response to the client.

At this point, if everything has gone successfully, the gateway has established a connection with the client and with the physical server that host's the client's database. The gateway is now in a position in which it may act as a proxy for relaying communications between the client 205 and the physical server.

In acting as a proxy, the gateway may parse client requests to determine whether the client request includes a database language statement that is in a predetermined set of database language statements. For example, if the client request includes a statement to create a database, delete a database, create a login, delete a login, alter a login, create a user, delete a user, or alter a user, the proxy may send one or more other requests to one or more of the logical user and master databases to fulfill the client request. If the request does not include such a statement the proxy may simply forwarding the request to a logical database, receive a response from the logical database, and forward the response to the client.

If a database is replicated or migrated from one database cluster to another cluster, a gateway may, for a defined period afterwards, continue to accept traffic from the client 205 and communicate with a database server of the other cluster. In another embodiment, the gateway may forward the request to the new cluster rather than directly accessing the physical back-end server of the other cluster.

The actions indicated above are not intended to be all-inclusive or exhaustive of the actions that may occur. Those of skill in the art may recognize other actions that may precede, occur in parallel, or follow after one or more of the actions above without departing from the spirit or scope of aspects of the subject matter described herein.

Although the exemplary environments illustrated in FIGS. 2-3 includes various numbers of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 4:
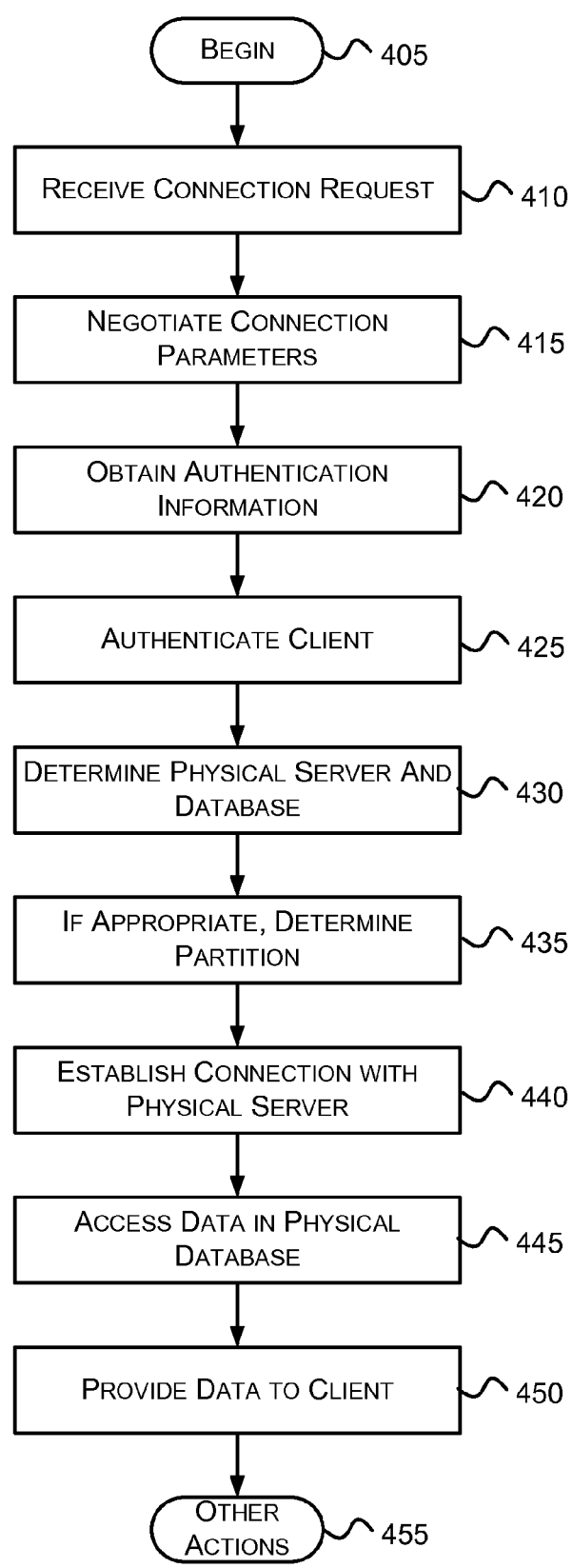
FIG. 4 is a flow diagram that generally represents some exemplary actions that may occur when a request to establish a connection is received form a client in accordance with aspects of the subject matter described herein.
Figure 5:
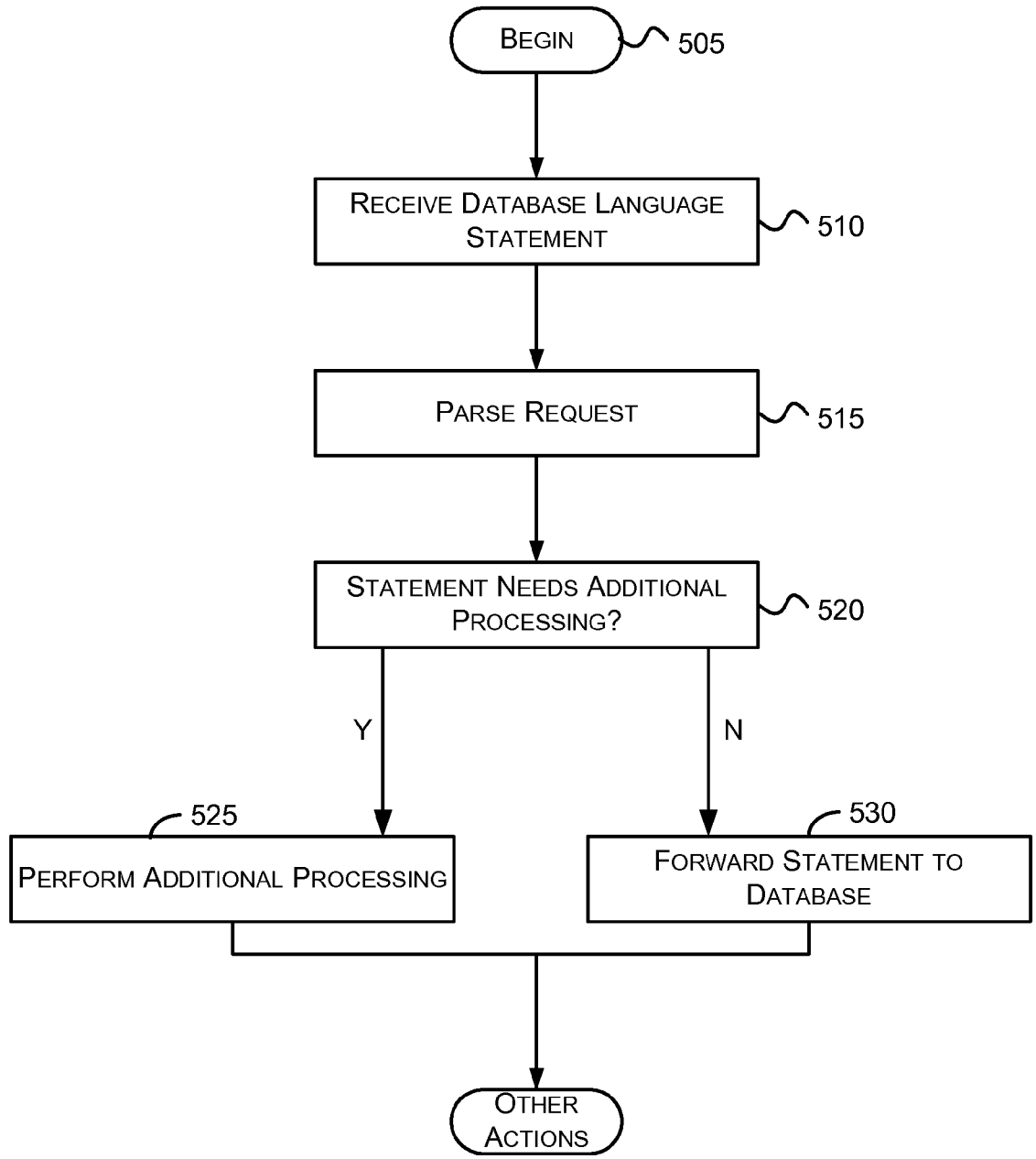
FIG. 5 is a flow diagram that generally represents some exemplary actions that may occur after a gateway has established a connection with a client and the client's logical database in accordance with aspects of the subject matter described herein.

FIGS. 4-5 are flow diagrams that generally represent actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents some exemplary actions that may occur when a request to establish a connection is received form a client in accordance with aspects of the subject matter described herein. At block 405, the actions begin.

At block 410, a connection request is received from a client. For example, referring to FIG. 3, the gateway 221 may receive a connection request from the client 205. The request may be conveyed in conjunction with a logical server name and a logical database name. Conveyed in this sense indicates that the request may include the logical server name and logical database name or be transmitted in a sequence of packets that includes these names.

At block 415, connection parameters are negotiated with the client. For example, referring to FIG. 3, the gateway 221 may negotiate connection parameters with the client 205.

At block 420, authentication information is obtained. As mentioned previously, this authentication information may be obtained from a logical master database associated with the logical user database that the client is attempting to access. For example, referring to FIG. 3, the gateway 221 may obtain authentication information from a logical master database hosted by the database server 310. To locate the logical master database the gateway 221 may consult the directory service 315 or data structure included on the gateway 221 or elsewhere. The directory service 315 may associate logical servers and/or databases with master databases.

At block 425, the client is authenticated. For example, referring to FIG. 3, the gateway 221 uses the authentication information to authenticate the client 205.

At block 430, a physical server and database are determined. As mentioned previously, this may be determined from a data structure that associates logical server names and logical database names with physical servers and physical databases. In one embodiment, this data structure may be stored as part of a directory service. For example, referring to FIG. 3, the gateway 221 may obtain an identifier of the physical server and database from the directory service 315.

At block 435, if appropriate, a partition of the physical database is determined. In other words, if logical user databases are included in partitions of the physical database, then the partition that includes the logical user database may be determined. For example, referring to FIG. 3, the gateway 221 may determine a partition of a physical database hosted by the database server 307 that includes a logical database.

At block 440, a connection is established with the physical server that hosts the physical database. For example, referring to FIG. 3, the gateway 221 may establish a TDS connection with the database server 307.

At block 445, data in the physical database is accessed. For example, referring to FIG. 3, in response to a request from the client 205 for data from the database, the gateway 221 may obtain data from the database hosted by the database server 307.

At block 450, the data is provided to the client. For example, referring to FIG. 3, the gateway 221 may provide the data to the client 205.

At block 455, other actions, if any, may be performed.

For example, if a physical database is migrated to a server of another datacenter, the gateway may receive a request from the client for the data from the database, establish a connection with the server of the other datacenter, obtain from the connection with the server the data requested by the client, and provide the data to the client.

FIG. 5 is a flow diagram that generally represents some exemplary actions that may occur after a gateway has established a connection with a client and the client's logical database in accordance with aspects of the subject matter described herein. At block 505, the actions begin.

At block 510, a database statement may be received in a request from the client. For example, referring to FIG. 3, the client 205 may request that a database be created.

At block 515, the request is parsed and the statement is found. For example, referring to FIG. 3, the gateway 221 may parse the request and find that the client 205 is requested that a new logical user database be created.

At block 520, a determination is made as to whether the statement needs additional processing. For example, when a user seeks to create a new database, the new database may need to be assigned to a physical server or partition, logical master database records may need to be updated, and so forth. To determine whether the statement needs additional processing, the gateway may determine whether the database language statement is in a predetermined set of database language statements as previously described.

If the statement needs additional processing, the actions continue at block 525; otherwise, the actions continue at block 530.

At block 525, the additional processing is performed. For example, referring to FIG. 3, the gateway 221 may create a new logical user database on one of the physical databases and may update data structures in a logical master database as appropriate.

At block 530, because the statement does not need additional processing, the statement may simply be forwarded to the database.

At block 535, other actions, if any may be performed.

Figure 6:
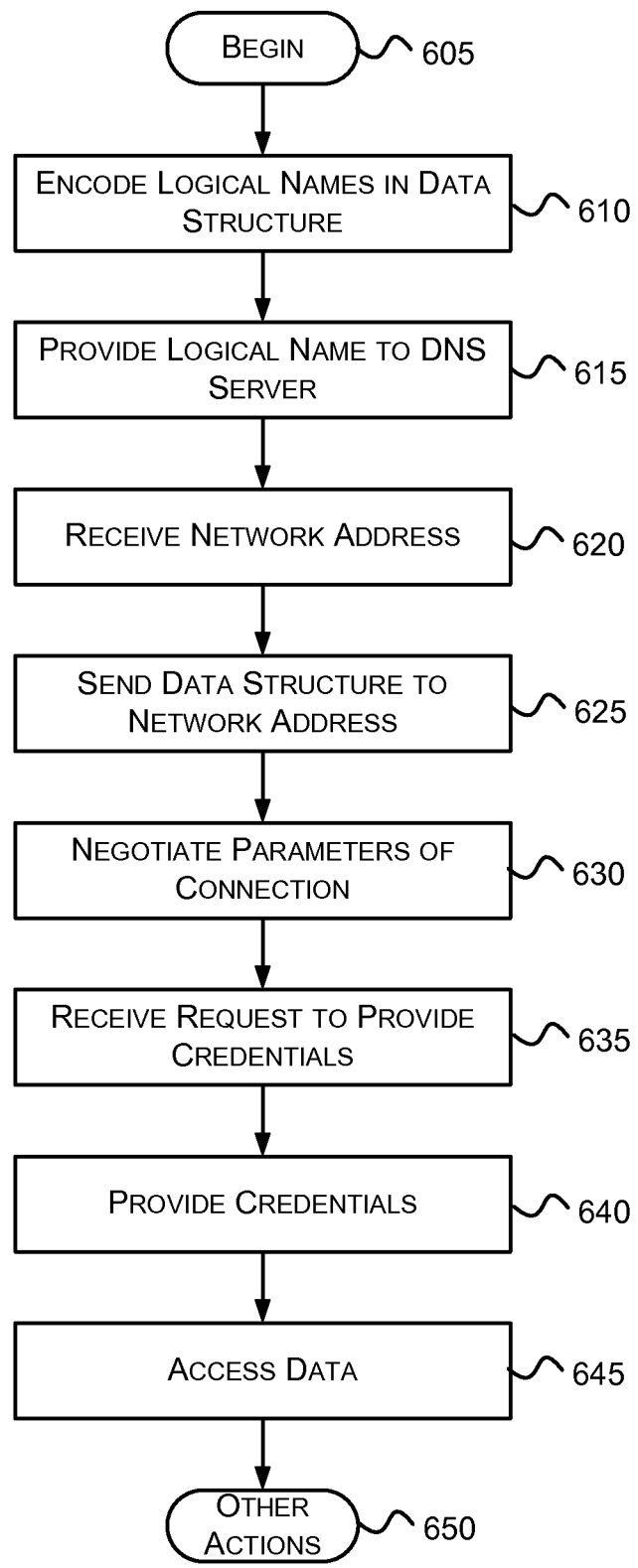
FIG. 6 is a flow diagram that generally represents some exemplary actions that may occur on a client in accordance with aspects of the subject matter described herein.

FIG. 6 is a flow diagram that generally represents some exemplary actions that may occur on a client in accordance with aspects of the subject matter described herein. At block 605, the actions begin.

At block 610, logical names are encoded in a data structure. For example, referring to FIG. 3, the client 205 may encode a logical database name and a logical server name into a connection string.

At block 615, the logical server name is provided to a DNS server. For example, referring to FIG. 2, the client 205 provides the logical server name myserver1.mydatabase.databasehoster.com to the DNS server 210.

At block 620, an address corresponding to the logical server name is obtained. For example, referring to FIG. 3, from the DNS server 210, the client 205 receives an IP address corresponding to the load balancer 215.

At block 625, the data structure is sent to a gateway reachable via the network address. For example, referring to FIG. 3, the client 205 sends a connection string to the gateway 221.

At block 630, parameters of the connection are negotiated. For example, referring to FIG. 3, the client 205 negotiates connection parameters with the gateway 221.

At block 635, the client receives a request to provide credentials. For example, referring to FIG. 3, the client 205 receives a request from the gateway 221 to provide credentials for accessing the logical database indicated by the client.

At block 640, the client provides the credentials. For example, referring to FIG. 3, the client 205 provides the credentials to the gateway 221.

At block 645, the client is able to access the data via the gateway that is acting as a proxy. For example, referring to FIG. 3, the client 205 may send a request for data. This request is received by the gateway 221 and forwarded to the appropriate physical server to obtain the requested data.

At block 650, other actions, if any, may be performed.

As can be seen from the foregoing detailed description, aspects have been described related to database virtualization. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. At a computer system, a method comprising:
encoding a logical server name and a logical database name in a data structure for accessing a database;
sending the data structure to a gateway, the gateway reachable via a network address associated with the logical server name, the gateway operable to determine a physical server that hosts the database and to act as a proxy in obtaining data from the database;
receiving, via a connection with the gateway, a request to provide credentials for accessing the database; and
providing the credentials via the connection.

2. The method of claim 1, wherein encoding a logical server name into a data structure comprises encoding the logical server name into a domain name recognizable by the domain name system server.

3. The method of claim 1, wherein encoding a logical server name into a data structure comprises encoding the logical server name into a database connection string.

4. The method of claim 1, wherein encoding a logical server name into a data structure comprises encoding the logical server name into a user name field.

5. The method of claim 1, wherein encoding a logical server name and logical database name in a data structure for accessing a database comprises encoding a logical server name and logical database name in a data structure for accessing a physical database.

6. The method of claim 1, further comprising prior to sending the database structure to a gateway:
provide at least the logical server name to a domain name system server; and
receiving the network address from the domain name system server; and
wherein sending the data structure to a gateway comprises sending the data structure to the network address.

7. The method of claim 1, further comprising prior to receiving a request to provide credentials negotiating one or more parameters of the connection with the gateway.

8. The method of claim 1, further comprising, subsequent to providing the credentials, accessing the database via the gateway.

9. A computer program product for use at a computer system, the computer program product comprising one or more computer storage devices having stored thereon computer-executable instructions that, when executed at a processor, cause the computer system to perform the following:
send a data structure to a gateway, the data structure having encoded therein a logical server name for accessing a database, the gateway reachable via a network address associated with the logical server name, the gateway operable to determine a physical server that hosts the database; and
provide credentials for accessing the database via a connection with the gateway.

10. The computer program product of claim 9, further comprising computer-executable instructions that, when executed, cause the computer system to encode the logical server name and a logical database name into the data structure.

11. The computer program product of claim 10, wherein computer-executable instructions that, when executed, cause the computer system to encode the logical server name and a logical database name in the data structure comprise computer-executable instructions that, when executed at, cause the computer system to encode the logical server name and the logical database name into a database connection string.

12. The computer program product of claim 9, further comprising computer-executable instructions that, when executed, cause the computer system to, prior to sending a data structure to a gateway:
provide at least the logical server name to a domain name system server; and
receive a network address corresponding from the domain name system server; and
wherein computer-executable instructions that, when executed at, cause the computer system to send a data structure to a gateway comprise computer-executable instructions that, when executed, cause the computer system to send the data structure to the network address.

13. The computer program product of claim 9, further comprising computer-executable instructions that, when executed, cause the computer system to:
negotiate one or more parameters of the connection with the gateway;
receive, via the connection with the gateway, a request to provide credentials for accessing the database; and
subsequent to providing the credentials, access the database via the gateway.

14. The computer program product of claim 9, further comprising the gateway being operable to act as a proxy in obtaining data from the database.

15. A computer system, the computer system comprising:
a processor;
system memory; and
one or more computer storage media having stored there on computer-executable instructions representing a client, the client configured to:
send a data structure to a gateway, the data structure having encoded therein a logical server name for accessing the database, the gateway reachable via a network address associated with the logical server name, the gateway operable to act as a proxy in obtaining data from the database; and
provide credentials for accessing the database via a connection with the gateway.

16. The computer system of claim 15, further comprising the client being configured to encode the logical server name and a logical database name into the data structure.

17. The computer system of claim 16, wherein the client being configured to encode the logical server name and a logical database name into the data structure comprises the client being configured to encode the logical server name and the logical database name into a database connection string.

18. The computer system of claim 15, further comprising the client being configured to, prior to sending data structure to a gateway:
provide at least the logical server name to a domain name system server; and
receive a network address corresponding from the domain name system server; and
wherein the client being configured to send a data structure to a gateway comprises the client being configured to send the data structure to the network address.

19. The computer system of claim 15, further comprising the client being configured to:
negotiate one or more parameters of the connection with the gateway.
receive, via the connection with the gateway, a request to provide credentials for accessing the database; and
subsequent to providing the credentials, access the database via the gateway.

20. The computer system of claim 15, further comprising the gateway being operable to determine a physical server that hosts the database.

* * * * *